(12) United States Patent
Liu

(10) Patent No.: US 11,438,679 B2
(45) Date of Patent: Sep. 6, 2022

(54) STORAGE BOX AND ELECTRONIC DEVICE

(71) Applicant: GUANGDONG OPPO MOBILE TELECOMMUNICATIONS CORP., LTD., Guangdong (CN)

(72) Inventor: Jia Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 200 days.

(21) Appl. No.: 16/931,774

(22) Filed: Jul. 17, 2020

(65) Prior Publication Data
US 2021/0058687 A1 Feb. 25, 2021

(30) Foreign Application Priority Data

Aug. 19, 2019 (CN) .......................... 201921347660.1

(51) Int. Cl.
*H04R 1/02* (2006.01)
*A45C 11/00* (2006.01)
(Continued)

(52) U.S. Cl.
CPC ................ *H04R 1/02* (2013.01); *A45C 11/00* (2013.01); *H02J 7/0044* (2013.01); *H02J 50/10* (2016.02);
(Continued)

(58) Field of Classification Search
CPC ......... H04R 1/02; H04R 1/1025; H02J 50/10; H02J 7/0044; A45C 11/00; A45C 2011/001
(Continued)

(56) References Cited

U.S. PATENT DOCUMENTS 10,701,472 B1 * 6/2020 Xu .................... H02J 7/0044
2015/0014471 A1 1/2015 Omodei
(Continued)

FOREIGN PATENT DOCUMENTS

CN 202282630 6/2012
CN 106724994 A 5/2017
(Continued)

OTHER PUBLICATIONS

EPO, Extended European Search Report for EP 20184876.9, dated Oct. 14, 2020.
(Continued)

*Primary Examiner* — Norman Yu
(74) *Attorney, Agent, or Firm* — Hodgson Russ LLP

(57) ABSTRACT

The present disclosure relates to a storage box. The storage box includes a body, a cover, and a first magnetic unit. The body is provided with a receiving space. The cover is rotatably attached to the body and is configured to rotate relative to the body to drive the storage box between an open state and a closed state. In the open state, the cover covers the receiving space. In the closed state, the receiving space is exposed. The first magnetic unit includes a first magnetic member attached to the body and a first attracting member attached to the cover. Opening the storage box from the closed state causes the first attracting member to move closer to the first magnetic member. Magnetic force between the first magnetic member and the first attracting member drives the cover to rotate away from the closed state and into the open state.

17 Claims, 13 Drawing Sheets

(51) Int. Cl.
*H02J 7/00* (2006.01)
*H02J 50/10* (2016.01)
*H04R 1/10* (2006.01)

(52) U.S. Cl.
CPC ...... *H04R 1/1025* (2013.01); *A45C 2011/001* (2013.01)

(58) Field of Classification Search
USPC .......................................................... 381/74
See application file for complete search history.

(56) References Cited

U.S. PATENT DOCUMENTS

| | | | | |
|---|---|---|---|---|
| 2016/0001932 A1* | 1/2016 | Chourreau | ............ | E05D 7/1011 220/829 |
| 2017/0094390 A1* | 3/2017 | Chawan | ................ | H04R 5/033 |

FOREIGN PATENT DOCUMENTS

| | | |
|---|---|---|
| CN | 206314706 | 7/2017 |
| CN | 206603376 | 11/2017 |
| CN | 208402074 U | 1/2019 |
| CN | 109429453 A | 3/2019 |
| CN | 109533640 A | 3/2019 |
| CN | 209089196 | 7/2019 |
| EP | 3151584 A2 | 4/2017 |
| FR | 2723071 A1 | 2/1996 |
| GB | 2264975 B | 2/1995 |

OTHER PUBLICATIONS

WIPO, ISR for PCT/CN2020/099321, Oct. 13, 2020.
IPI, Office Action for IN Application No. 202014029195, dated Nov. 10, 2021.
EPO, Communication for EP Application No. 20184876.9, dated Oct. 1, 2021.

* cited by examiner

STORAGE BOX AND ELECTRONIC DEVICE

CROSS REFERENCE TO RELATED APPLICATIONS

The present disclosure claims priority to Chinese Patent Application No. 201921347660.1, filed Aug. 19, 2019, the entire disclosure of which is incorporated herein by reference.

TECHNICAL FIELD

The present disclosure relates to the field of storage device, and more particularly to a storage box and an electronic device.

BACKGROUND

True wireless stereo (TWS) headphones are generally equipped with headphone storage boxes. The headphone storage box is configured to store and charge the TWS headphone. A cover of the headphone storage box is generally attached to a body of the headphone storage box via a shaft. However it is difficult to reliably secure the cover and the body when the earphone storage box is opened.

SUMMARY

According to a first aspect of the present disclosure, there is provided a storage box. The storage box includes a body, a cover, and a first magnetic unit. The body is provided with a receiving space. The cover is rotatably attached to the body. The cover is configured to rotate relative to the body to drive the storage box between an open state and a closed state. The cover covers the receiving space when the storage box is in the closed state, and the receiving space is exposed when the storage box is in the open state. The first magnetic unit includes a first magnetic member and a first attracting member. The first magnetic member is attached to the body and the first attracting member is attached to the cover. Opening the storage box causes the first attracting member to move closer to the first magnetic member such that magnetic force between the first magnetic member and the first attracting member drives the cover to rotate away from a closed state and into an open state.

According to a second aspect of the present disclosure, there is provided a storage box. The storage box includes a body, a cover, and a magnetic unit. The body defines a receiving space. The cover is rotatably attached to the body and configured to rotatably drive the storage box to switch between an open state and a closed state. The magnetic unit includes a first magnetic member and a first attracting member. The first magnetic member is attached to the body, and the first attracting member is attached to the cover. Rotating the cover from the closed stated toward the open state causes the first attracting member to move closer to the first magnetic member. After rotating the cover to a certain position with respect to the body, magnetic force between the first magnetic member and the first attracting member drives the cover to rotate to and remain the open state.

According to a third aspect of the present disclosure, there is provided an electronic device. The electronic device includes a body, a cover, earphones, a battery, a first magnetic unit, and a second magnetic unit. The body defines a receiving space. The cover is movably attached to the body and operable between a closed position where the cover covers the receiving space and an open position where the receiving space is exposed. The earphones are configured to be detachably stored in the receiving space. The first magnetic unit includes a first magnetic member and a first attracting member respectively attached to the body and the cover. The second magnetic unit includes a second magnetic member and a second attracting member respectively attached to the body and the cover. Rotating the cover from the closed position toward the open position causes the first attracting member to move closer to the first magnetic member till the cover is secured to the body in the open position, and rotating the cover from the open position to the closed position causes the second attracting member to move closer to the second magnetic member to enable the cover to rotate to away from the open position and into the closed position.

BRIEF DESCRIPTION OF THE DRAWINGS

To better illustrate the technical solutions of embodiments of the present disclosure or the related art, the following descriptions will briefly illustrate the accompanying drawings described in the illustrated embodiments or the related art. Obviously, the following described accompanying drawings merely illustrate some embodiments of the present disclosure. Those skilled in the art may obtain other accompanying drawings according to the described accompanying drawings without creative efforts.

DETAILED DESCRIPTION

Figure 1:
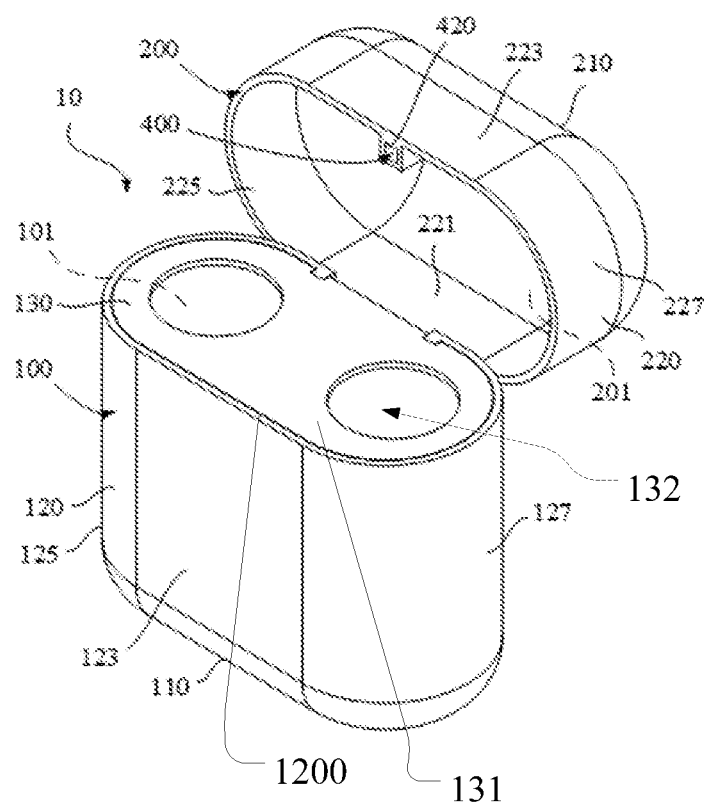
FIG. 1 is a schematic view of a storage box in an open state according to an embodiment of the present disclosure.

To facilitate understanding of the present disclosure, the present disclosure will be described completely with reference to the accompanying drawings. The accompanying drawings illustrate the embodiments of the present disclosure. However, the present disclosure can be implemented in many different ways and is not limited to the particular embodiments described herein. To the contrary, these embodiments are provided to understand the present disclosure more thoroughly and comprehensively.

A storage box includes a body, a cover, and a first magnetic unit. The body is provided with a receiving space. The cover is rotatably attached to the body. The cover is configured to rotate relative to the body to drive the storage box between an open state and a closed state. The cover covers the receiving space when the storage box is in the closed state, and the receiving space is exposed when the storage box is in the open state. The first magnetic unit includes a first magnetic member and a first attracting member. The first magnetic member is attached to the body and the first attracting member is attached to the cover. Opening the storage box causes the first attracting member to move closer to the first magnetic member such that magnetic force between the first magnetic member and the first attracting member drives the cover to rotate away from a closed state and into an open state.

A storage box includes a body, a cover, and a magnetic unit. The body defines a receiving space. The body defines a receiving space. The cover is rotatably attached to the body and configured to rotatably drive the storage box to switch between an open state and a closed state. The magnetic unit includes a first magnetic member and a first attracting member. The first magnetic member is attached to the body, and the first attracting member is attached to the cover. Rotating the cover from the closed stated toward the open state causes the first attracting member to move closer to the first magnetic member. After rotating the cover to a certain position with respect to the body, magnetic force between the first magnetic member and the first attracting member drives the cover to rotate to and remain the open state.

An electronic device includes a body, a cover, earphones, a battery, a first magnetic unit, and a second magnetic unit. The body defines a receiving space. The cover is movably attached to the body and operable between a closed position where the cover covers the receiving space and an open position where the receiving space is exposed. The earphones are configured to be detachably stored in the receiving space. The first magnetic unit includes a first magnetic member and a first attracting member respectively attached to the body and the cover. The second magnetic unit includes a second magnetic member and a second attracting member respectively attached to the body and the cover. Rotating the cover from the closed position toward the open position causes the first attracting member to move closer to the first magnetic member till the cover is secured to the body in the open position, and rotating the cover from the open position to the closed position causes the second attracting member to move closer to the second magnetic member to enable the cover to rotate to away from the open position and into the closed position.

Figure 2:
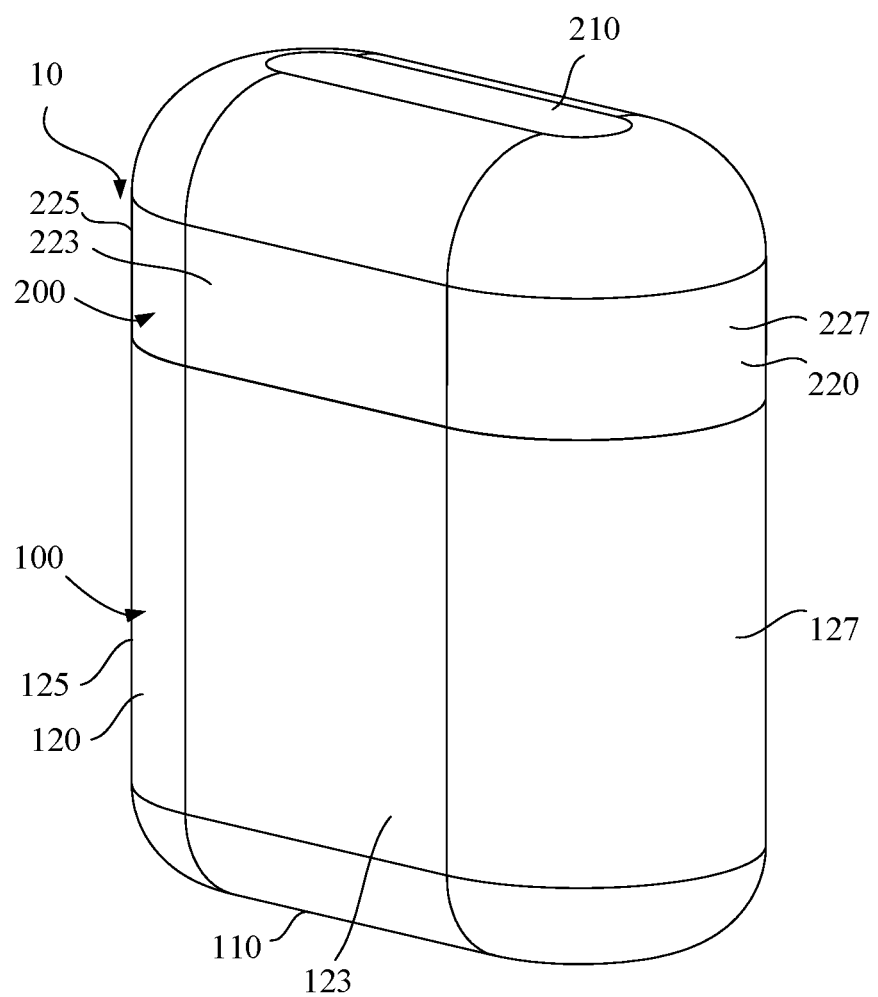
FIG. 2 is a schematic view of the storage box illustrated in FIG. 1 in a closed state.

With reference to FIGS. 1 and 2, in an embodiment, the storage box 10 is configured to store and charge TWS headphones, which improves the convenience of storing and charging the TWS headphones. In other embodiments, the storage box 10 may be configured to store other electronic devices or objects and may not have a charging function. Specifically, the present disclosure is described by taking the storage box 10 for storing TWS headphones as an example. The storage box 10 includes a body 100 which is generally a rectangular block. The body 100 is provided with a receiving space 101. In the embodiment in which the storage box 10 is configured to store TWS headphones, the receiving space 101 is further configured to receive a battery. In this way, the battery can charge the TWS headphones stored in the storage box 10. The battery can be a lithium battery that can be repeatedly charged and discharged. In other embodiments, the body 100 can be in a cylindrical shape, in a prismatic shape, or in other shapes.

The cover 200 is attached to the body 100 and capable of rotating relative to the body 100 to cause the storage box 10 to be in an open state or a closed state. As illustrated in FIG. 1, when the storage box 10 is in the closed state, the cover 200 covers the receiving space 101 so as to protect the TWS headphones stored in the receiving space 101 of the storage box 10. In the embodiment in which the storage box 10 includes the battery, each of the body 100 and the TWS headphone is provided with a metal contact correspondingly. After covering the body 100, the cover 200 can abut against the TWS headphone stored in the storage box 10 to cause the metal contacts of the body 100 and the battery to well contact so as to form a reliable electrical connection. Thus, the TWS headphone can be charged by the battery. As illustrated in FIG. 2, when the storage box 10 is in the open state, the receiving space 101 is exposed, which is convenient for a user to place the TWS headphone in the receiving space 101 of the storage box 10.

Figure 3:
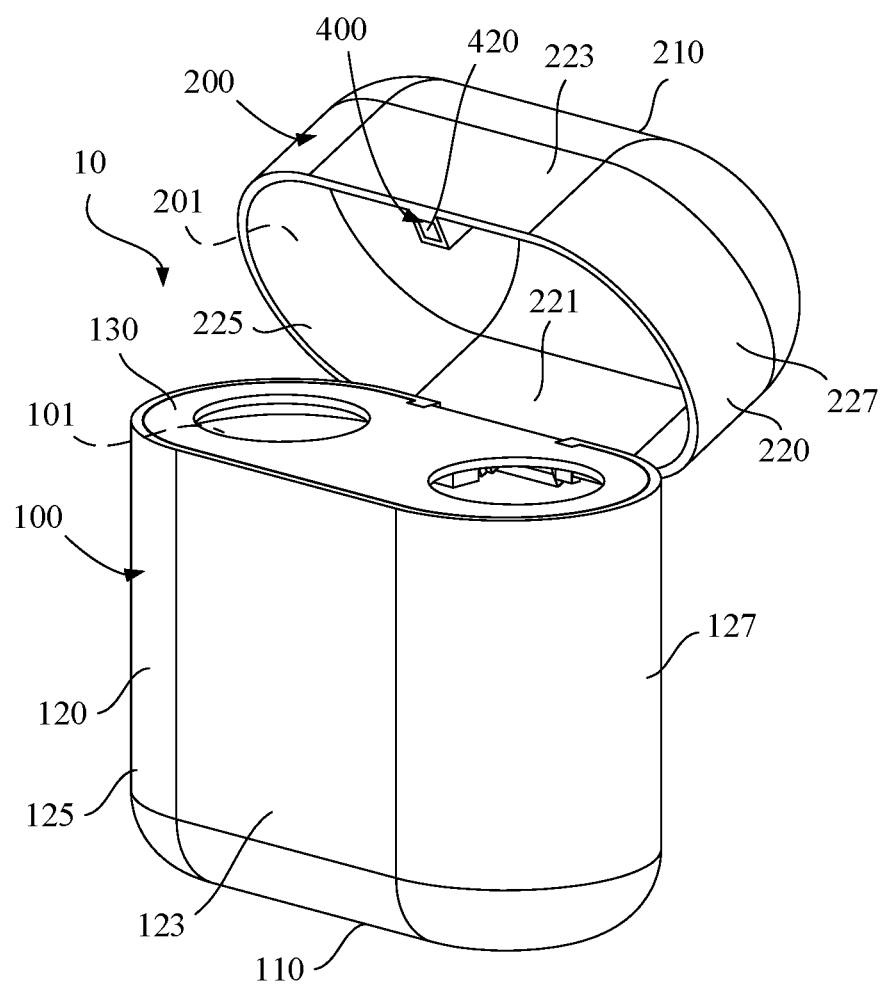
FIG. 3 is a schematic view of the storage box illustrated in FIG. 2 during opening.
Figure 4:
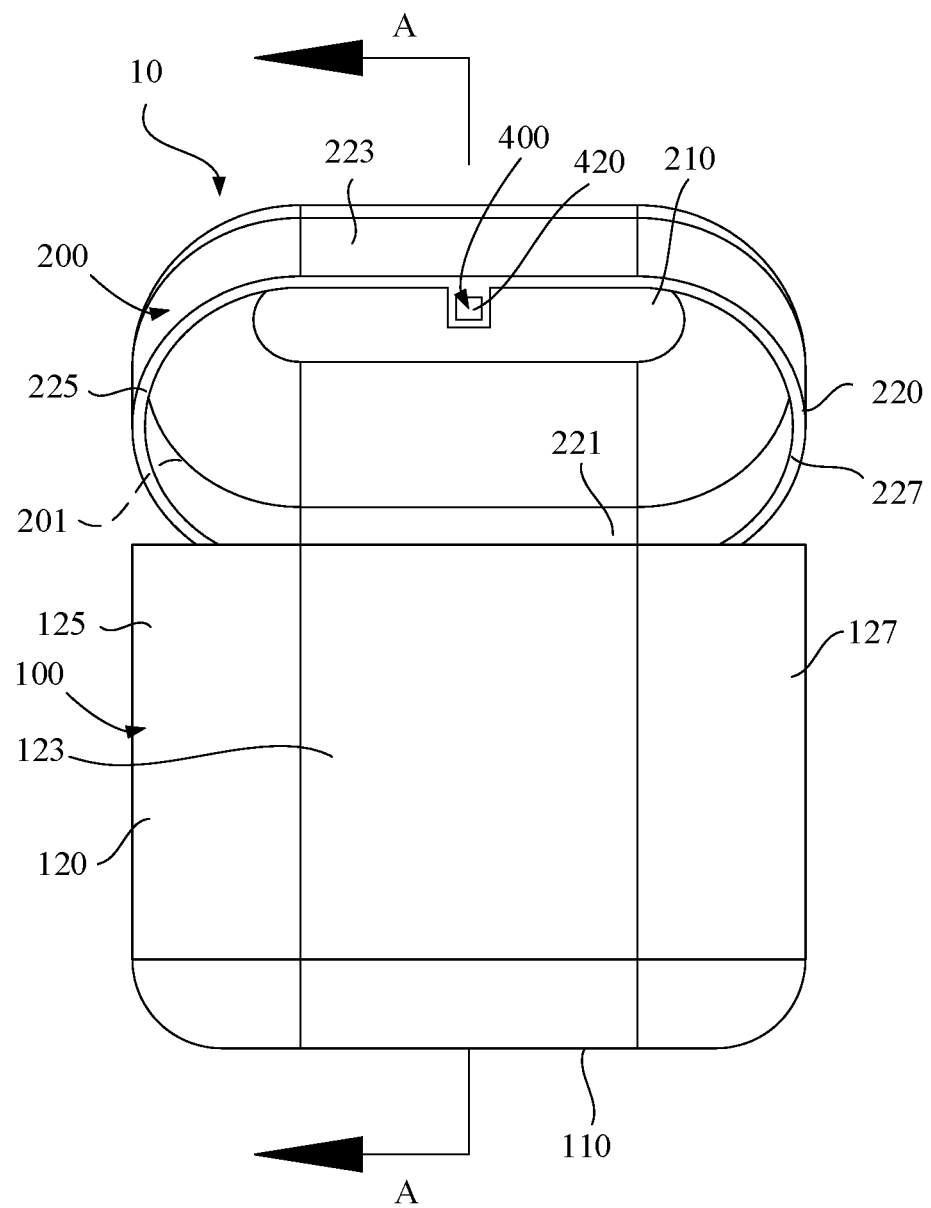
FIG. 4 is a front view of the storage box illustrated in FIG. 3.
Figure 5:
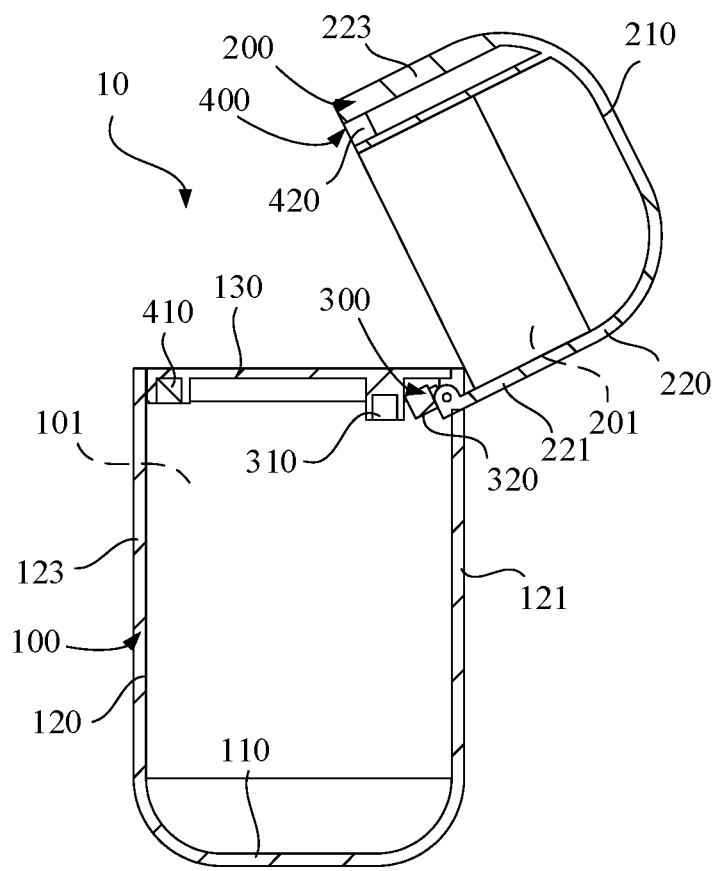
FIG. 5 is a cross-sectional view of the storage box illustrated in FIG. 4 along the line A-A.
Figure 6:
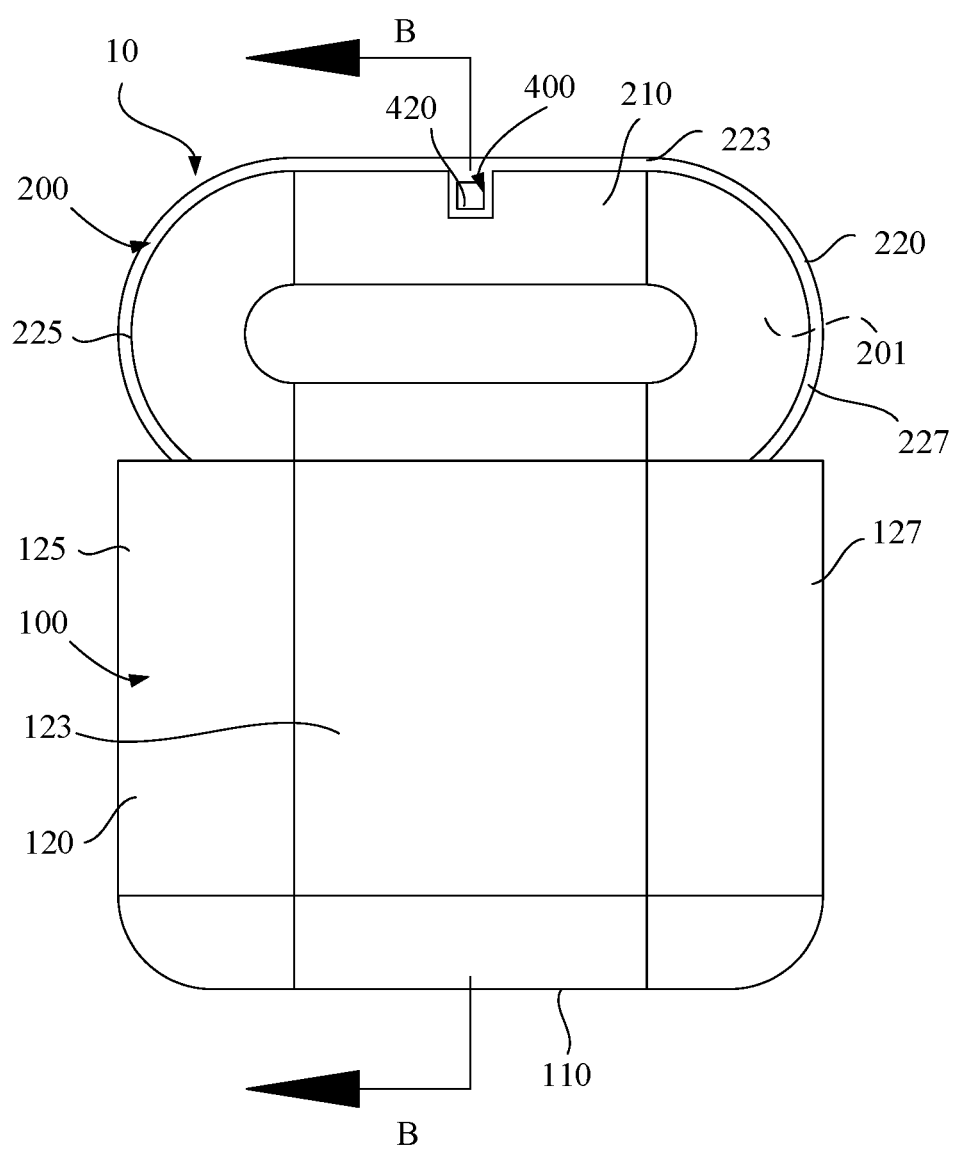
FIG. 6 is a front view of the storage box illustrated in FIG. 1.
Figure 7:
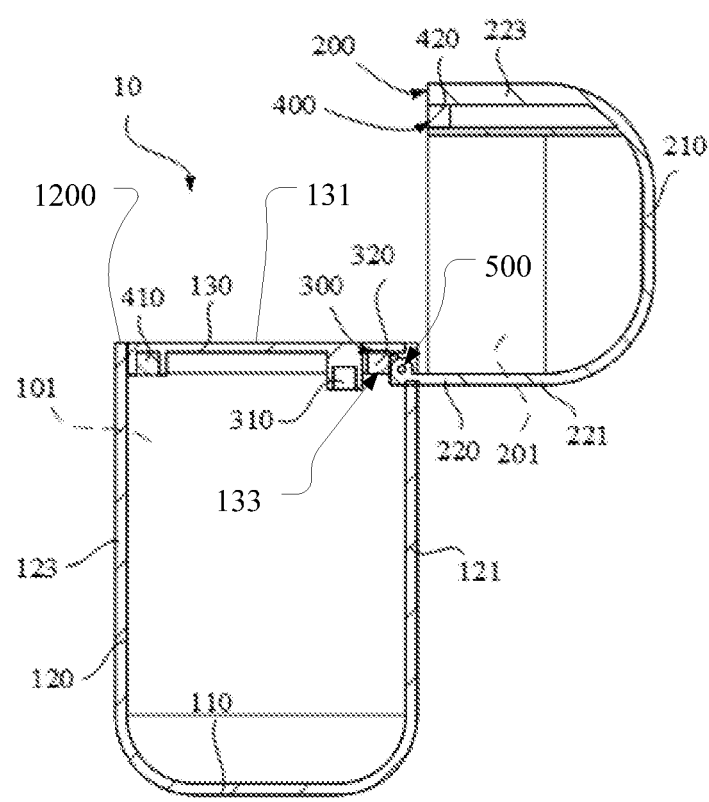
FIG. 7 is a cross-sectional view of the storage box illustrated in FIG. 6 along the line B-B.

With reference to FIGS. 3, 4, and 5, the storage box 10 can further include a magnetic unit 300. The magnetic unit 300 includes a first magnetic member 310 and a first attracting member 320. The first magnetic member 310 is disposed at body 100 and the first attracting member 320 is disposed at the cover 200. As illustrated in FIGS. 4 and 5, in a process of opening the storage box 10, the first attracting member 320 can be moved gradually closer to the first magnetic member 310. The magnetic force between the first magnetic member 310 and the first attracting member 320 drives the cover 200 to rotate to be in an open state and keeps the cover 200 in the open state, as illustrated in FIGS. 6 and 7. Specifically, one of the first magnetic member 310 and the first attracting member 320 is a magnet, and the other of the first magnetic member 310 and the first attracting member 320 is a magnet or a magnetizable metal member. The magnetizable metal member may be made of iron, cobalt, nickel, and their alloys. In the embodiment, the first magnetic member 310 and the first attracting member 320 both are magnets. As illustrated in FIG. 2, to open the storage box 10 in the closed state, a torque is applied to the cover 200 to rotate the cover 200 relative to the body 100 such that the first magnetic member 310 and the first attracting member 320 can be moved close to each other. As illustrated in FIG. 5, after the cover 200 is rotated to a certain degree relative to the body 100, the first attracting member 320 may be moved sufficiently close to the first attracting member 320 such that there is no need to continue to apply the torque to the cover 200. At this position, the magnetic force between the first magnetic member 310 and the first attracting member 320 can drive the cover 200 to continue to rotate relative to the body 100 so as to automatically open the storage box 10 and reliably keep the cover 200 in the open state, as illustrated in FIG. 7. When the cover 200 is in the open state, the magnetic force between the first magnetic member 310 and the first attracting member 320 prevents the cover 200 from inadvertently rotating relative to the body 100 to in the closed state. This can allow a user to perform operations, such as, taking the TWS headphone out of the receiving space 101 of the storage box 10 or placing the TWS headphone in the receiving space 101 of the storage box 10, thereby improving convenience and functionality.

When opening the storage box 10, the first attracting member 320 can be moved to gradually approach the first magnetic member 310 such that the magnetic force between the first magnetic member 310 and the first attracting member 320 drives the cover 200 to rotate to be in the open state. That is, the magnetic force between the first magnetic member 310 and the first attracting member 320 can act as a driving force to automatically open the storage box 10 after the cover 200 is rotated a certain degree relative to the body 100. The magnetic force between the first magnetic member 310 and the first attracting member 320 can keep the cover 200 in the open state such that the cover 200 is reliably secured to the body 100 in the open state, which can conveniently allow the user to perform operations with the storage box.

Figure 8:
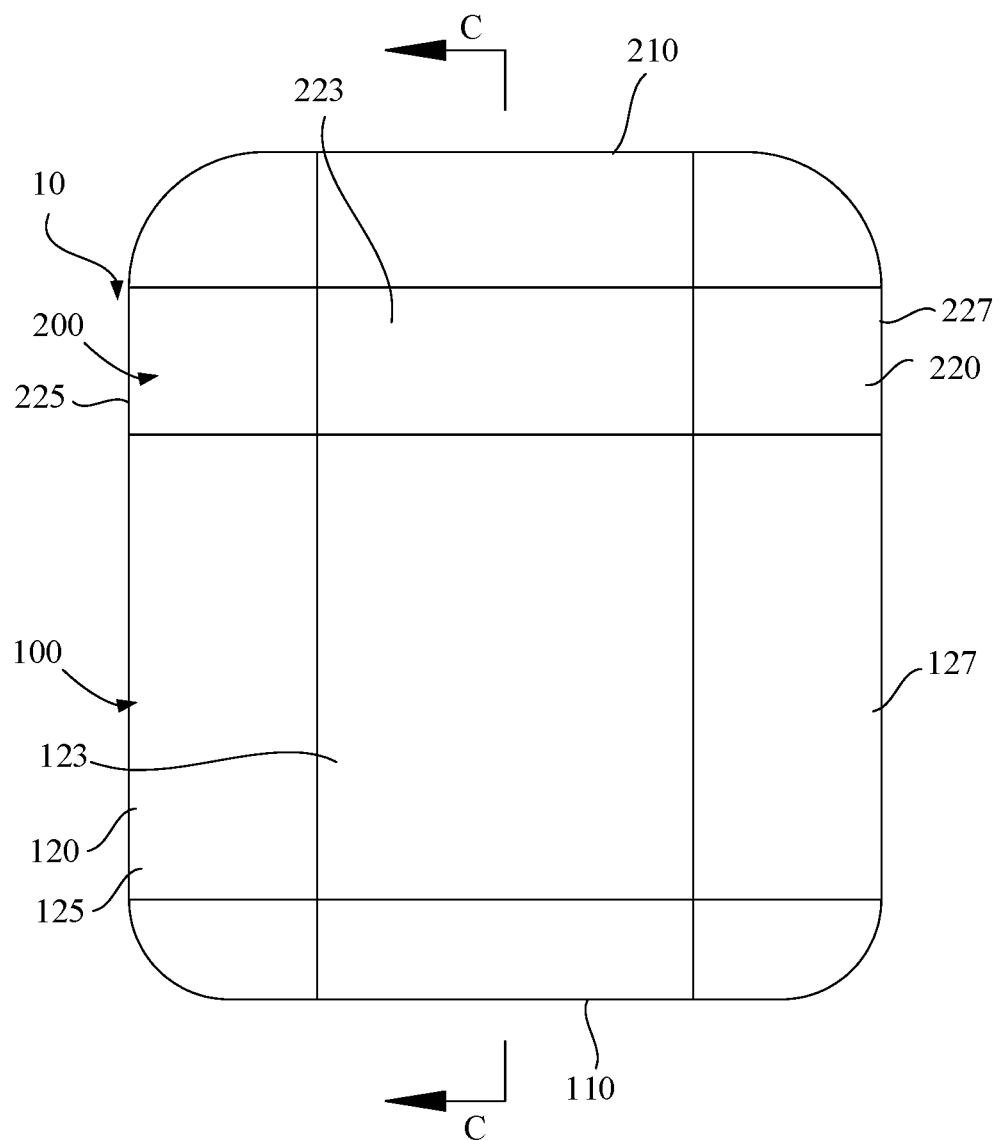
FIG. 8 is a front view of the storage box illustrated in FIG. 2.
Figure 9:
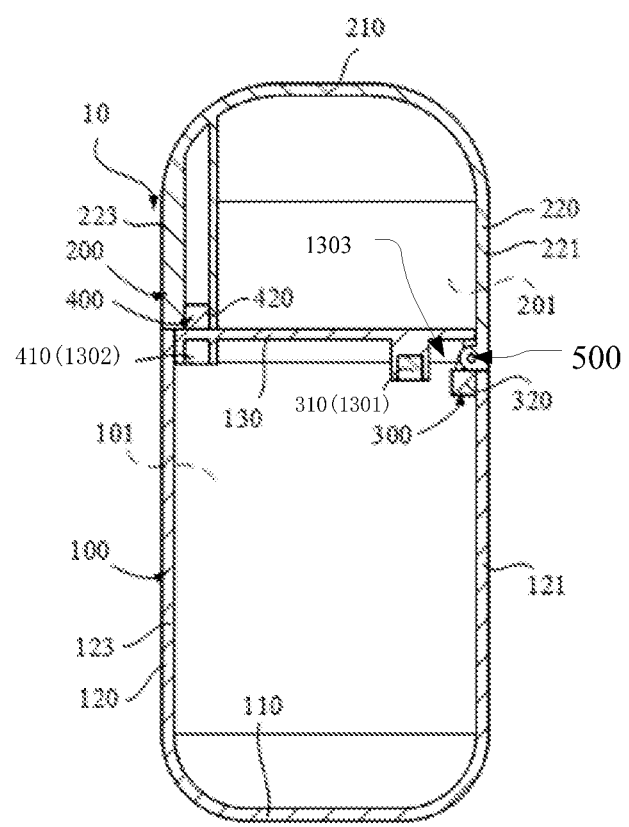
FIG. 9 is a cross-sectional view of the storage box illustrated in FIG. 8 along the line C-C.
Figure 10:
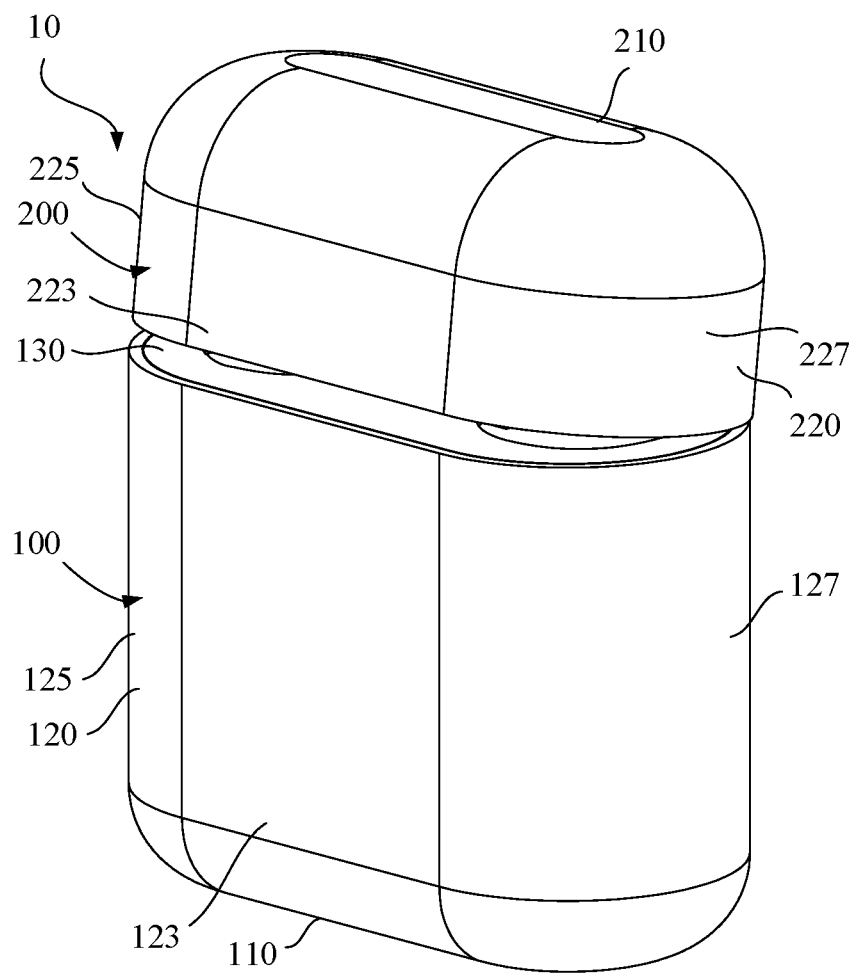
FIG. 10 is a schematic view of the storage box illustrated in FIG. 1 during closing.
Figure 11:
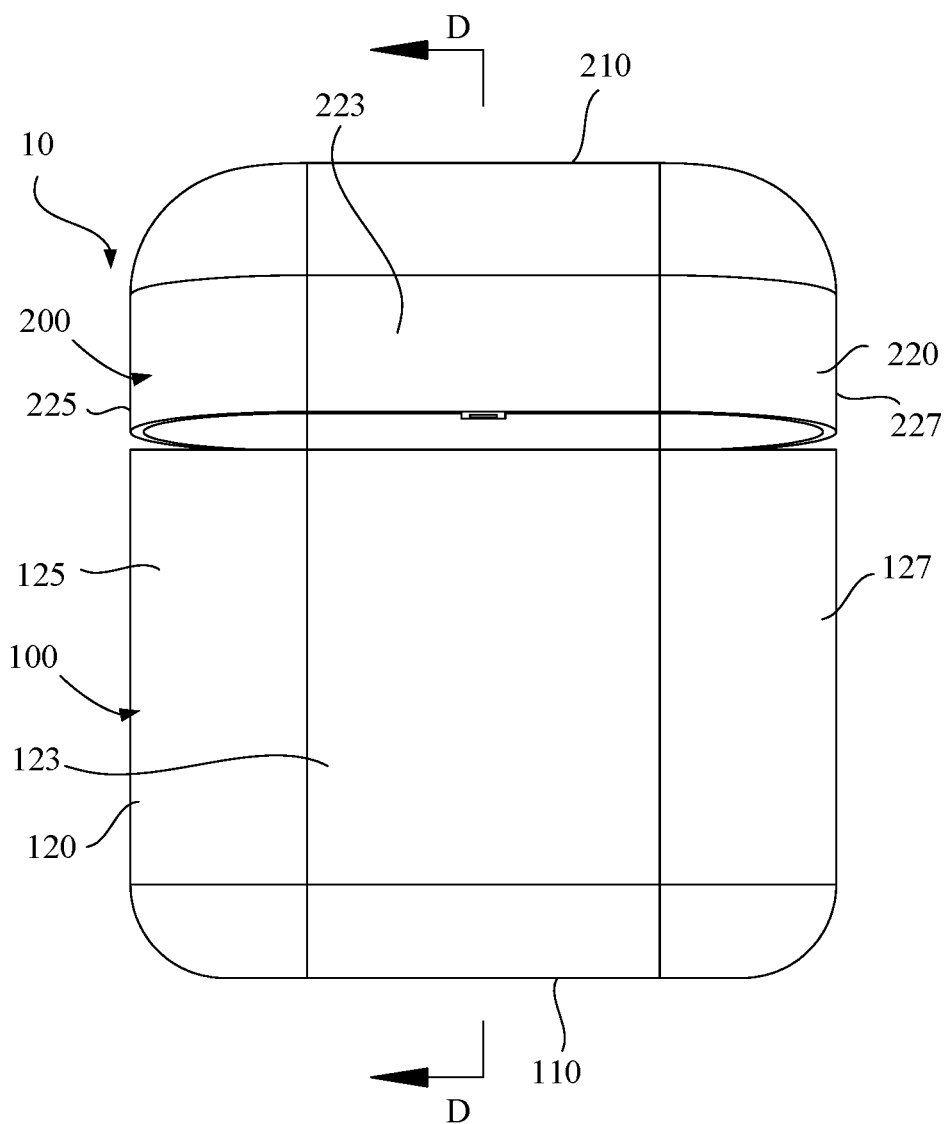
FIG. 11 is a front view of the storage box illustrated in FIG. 10.
Figure 12:
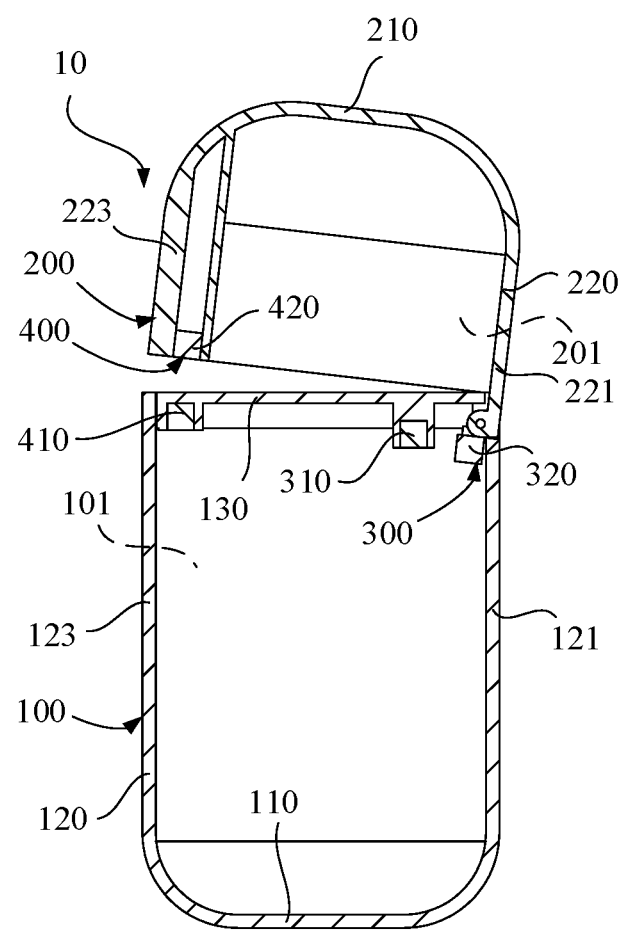
FIG. 12 is a cross-sectional view of the storage box illustrated in FIG. 11 along the line D-D.

As illustrated in FIGS. 8 and 9, the storage box 10 can further include another magnetic unit 400. The magnetic unit 400 includes a second magnetic member 410 and a second attracting member 420. The second magnetic member 410 is disposed at the body 100 and the second attracting member 420 is disposed at the cover 200. As illustrated in FIGS. 10, 11, and 12, in a process of closing the storage box 10, the second attracting member 420 can be moved to gradually approach the second magnetic member 410 such that the magnetic force between the second magnetic member 410 and the second attracting member 420 drives the cover 200 to rotate to be in the closed state and keeps the cover 200 in the closed state. Specifically, one of the second magnetic attracting member 410 and the second attracting member 420 is a magnet, and the other of the second magnetic attracting member 410 and the second attracting member 420 is a magnet or a magnetizable metal member. The magnetizable metal member may be made of iron, cobalt, nickel, and their alloys. In the embodiment, the second magnetic member 410 and the second attracting member 420 both are magnets. To switch the storage box 10 from the closed state to the open state, a torque is applied to the cover 200 to overcome the magnetic force between the first magnetic member 310 and the first attracting member 320 such that the cover 200 is rotated relative to the body 100. The second magnetic member 410 and the second attracting member 420 are driven to gradually approach each other. When the storage box 10 is about to be closed, there may not need to continue to apply the force to the cover 200. The magnetic force between the second magnetic member 410 and the second attracting member 420 the cover 200 to rotate to be in the closed state. In the closed state, the magnetic force between the second magnetic member 410 and the second attracting member 420 enables the cover 200 to be reliably secured to the body 100, which can prevent the storage box 10 from being inadvertently opened. It should be understood, that the magnetic unit 400 may not be necessary. For example, a snap structure can be applied to reliably fix the cover to the body when the storage box 10 is in the closed state.

Figure 13:
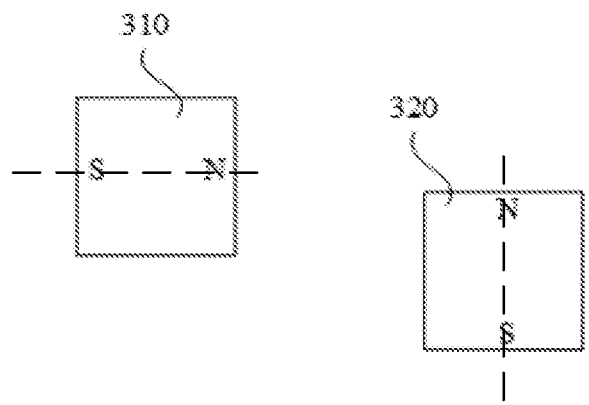
FIG. 13 is a schematic view illustrating a positional relationship between a first magnetic member and a first attracting member of the storage box illustrated in FIG. 9.

As illustrated in FIGS. 3, 4 and 5, in the embodiment in which the body 100 is generally a rectangular block, the body 100 includes a bottom wall 110, a circumferential member 120 extending from an edge of the bottom wall 110, and a supporting member 130 connected to an end of the circumferential member 120 away from the bottom wall 110. The bottom wall 110, the circumferential member 120, and the supporting member 130 cooperatively define the receiving space 101. The first magnetic member 310 and the second magnetic member 410 are attached to the supporting member 130. As illustrated in FIG. 9, when the storage box 10 is in the closed state, a distance between the first magnetic member 310 and an outer surface of the bottom wall 110 is greater than a distance between the first attracting member 320 and the outer surface of the bottom wall 110. When opening the storage box 10, the first attracting member 320 is moved in a direction away from the bottom wall 110 and gradually closed to the first magnetic member 310. Specifically, In an embodiment, the second magnetic member 410 and the second attracting member 420 both are bar magnets, as illustrated in FIGS. 9 and 13, when the storage box 10 is in the closed state, the N pole and the S pole of the first magnetic member 310 are horizontally disposed, that is, a line extending through the N pole and the S pole of the first magnetic member 310 is horizontal, and the N pole and the S pole of the first attracting member 320 are vertically disposed, that is, a line extending through the N pole and the S pole of the first attracting member 320 is vertical. Thus, a line of magnetic force of the first magnetic member 310 in an extending direction of the first magnetic member 310 along the line extending through the N pole and the S pole of the first magnetic member 310 is substantially perpendicular to a line of magnetic force of the first attracting member 320 in an extending directions of the first attracting member 320 along the line extending through the N pole and the S pole of the first attracting member 320. In this way, the magnetic force between the first magnetic member 310 and the first attracting member 320 is relatively small.

Figure 14:
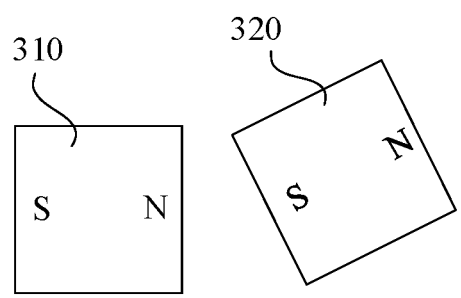
FIG. 14 is a schematic view illustrating a positional relationship between a first magnetic member and a first attracting member of the storage box illustrated in FIG. 5.
Figure 15:
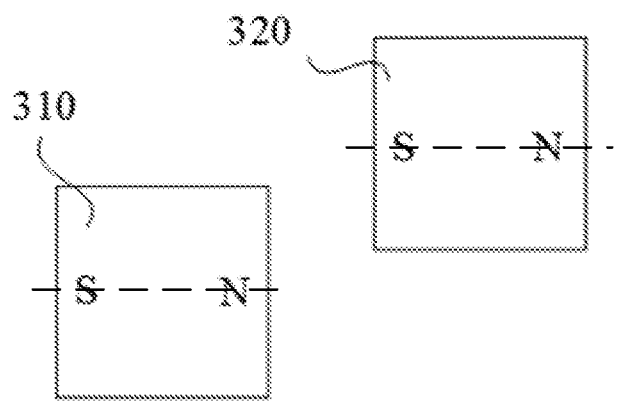
FIG. 15 is a schematic view illustrating a positional relationship between a first magnetic member and a first attracting member of the storage box illustrated in FIG. 7.

As illustrated in FIGS. 5 and 14, when the cover 200 is rotated relative to the body 100 to open the storage box 10, the first attracting member 320 is rotated clockwise such that the unlike poles of the first magnetic member 310 and the first attracting member 320 are close to each other until the line extending through the N pole and the S pole of the first magnetic member 310 and the line extending through the N pole and the S pole of the first attracting member 320 are about to be consistent, that is, parallel to each other. At this time, the magnetic force generated is relatively large. As illustrated in FIGS. 7 and 15, when the storage box 10 is in the open state, the line extending through the N pole and the S pole of the first magnetic member 310 and the line extending through the N pole and the S pole of the first attracting member 320 are about to be consistent, that is, parallel to each other, such that the cover 200 is reliably positioned on the body 100. With this structure, when the storage box 10 is in the closed state, the first magnetic member 310 and the first attracting member 320 are staggered or misaligned with each other in a horizontal direction and in a vertical direction in space. The vertical direction extends along the line extending through the N pole and the S pole of the first magnetic member 310, the horizontal direction extends along the line extending through the N pole and the S pole of the first attracting member 320. As a result, a distance between the first magnetic member 310 and the first attracting member 320 is relatively large and accordingly the magnetic force therebetween is relatively small. When opening the storage box 10, such a structure can avoid the first magnetic member 310 and the first attracting member 320 to generate a large blocking force to block the rotation of the cover 200.

It can be understood that, in other embodiments, the second magnetic member 410 and the second attracting member 420 are both bar-shaped. When the storage box 10 is in the closed state, the first magnetic member 310 is horizontally disposed, that is, disposed along a length direction of the first magnetic member 310; the first attracting member 320 is vertically disposed, that is, disposed along a length direction of the first attracting member 320; the length direction of the first magnetic member 310 and the length direction of the first attracting member 320 are perpendicular to each other. When the storage box 10 is in the open state, the first magnetic member 310 is horizontally disposed, that is, disposed along the length direction of the first magnetic member 310; the first attracting member 320 is horizontally disposed, that is, disposed along the length direction of the first attracting member 320; the length direction of the first magnetic member 310 and the length direction of the first attracting member 320 are parallel to each other. When the storage box is in the closed state, the first magnetic member 310 and the first attracting member 320 are staggered or misaligned with each other in the length direction of the first magnetic member 310 and the length direction of the first attracting member 320.

As illustrated in FIG. 9, the circumferential member 120 includes a first side wall 121 and a second side wall 123 opposite to each other. As illustrated in FIG. 8, the circumferential member 120 further includes a third side wall 125 and a fourth side wall 127 disposed opposite to each other. The third side wall 125 and the fourth side wall 127 are connected between the first side wall 121 and the second side wall 123. The first side wall 121, the second side wall 123, the third side wall 125, and the fourth side walls 127 are sequentially and circumferentially disposed between the bottom wall 110 and the supporting member 130. The first magnetic member 310 is closer to the first side wall 121 than the second magnetic member 410. As illustrated in FIG. 9, the supporting member 130 defines a first slot 1301 close to the first side wall 121 and the first slot 1301 is configured to mount the first magnetic member 310 therein. The supporting member 130 defines a second slot 1302 close to the second side wall 123 and the second slot 1302 is configured to mount the second magnetic member 410 therein. Thus, the first slot 1301 and the second slot 1302 are spaced apart from each other. The supporting member 130 further defines an avoidance space 1303 next to the first slot 1301 and close to the first side wall 121, and the avoidance space 1303 is configured to allow the first attracting member 320 to move therein. The first slot 1301, the second slot 1302, and the avoidance space 1303 are disposed below a top wall 131 of the supporting member 130. The first magnetic member 310 is disposed in the first slot 1301.

The first magnetic member 310 and the second magnetic member 410 received in the supporting member 130 are spaced apart from each other. At the same time, the first magnetic member 310 and the second magnetic member 410 are located below the top wall 131 of the supporting member 130. In this way, when the storage box 10 is in the open state, the first magnetic member 310 and the second magnetic member 410 are invisible, thereby allowing the storage box 10 to have a good appearance. The supporting member 130 can cover an opening defined at an end of the circumferential member 120 away from the bottom wall 110 and define through holes 132 for mounting the TWS earphones, as illustrated in FIG. 1. An upper surface of the top wall 131 of the supporting member 130 can be flush with an end surface 1200 of the circumferential member 120 away from the bottom wall 110 of the body 100, such that the body 100 has a good appearance, the cover 200 and the body 100 cooperate well, and closing the cover 200 and the body 100 is achieved. In an alternative embodiment, the end surface 1200 of the supporting member 130 away from the bottom wall 110 may be provided with stepped members and the cover 200 is provided with recessed portions. When the storage box 10 is in the closed state, the stepped members engage with the recessed portions to form a relatively firm positioning structure between the cover 200 and the body 100.

As illustrated in FIG. 7 and FIG. 9, when opening the storage box 10, the cover 200 or the first attracting member 320 can abut against the supporting member 130 to limit a range of rotation of the cover 200 relative to the body 100. This can prevent a hinge member 500 that rotatably attaches to cover 200 to the body 100 from being damaged due to excessive rotation of the cover 200. For example, the hinge member 500 includes a rotation shaft provided at one of the cover 200 and the body 100, and a rotation hole provided in the other of the cover 200 and the body 100. The rotation shaft is disposed within the rotation hole such that the cover 200 is rotatably attached to the body 100. The hinge member 500 is also received in the avoidance space 1303. Since the cover 200 or the first attracting member 320 can abut against the supporting member 130, such as a portion of the supporting member 130 above the avoidance space 1303, that is, a lower surface of the top wall 131 of the supporting member 130 above the avoidance space 1303, the rotating shaft or the rotation hole from being damaged due to the excessive rotation of the cover 200 is prevented.

As illustrated in FIG. 9, the cover 200 is provided with a receiving space 201. When the storage box 10 is in the closed state, the receiving space 201 communicates with the receiving space 101 to define a large storage space in the storage box 10 such that part of TWS earphones can be received in the receiving space 201 of the cover 200. As a result, the TWS earphones are well stored in the storage box 10. In the embodiment, the cover 200 includes a top wall 210 and a circumferential member 220 circumferentially extending from an edge of the top wall 210. The top wall 210 and the circumferential member 220 cooperatively define the receiving space 201. The first attracting member 320 and the second attracting member 420 are attached to the circumferential member 220. As illustrated in FIGS. 8 and 9, the circumferential member 220 includes a first side wall 221 and a second side wall 223 opposite to each other, and a third side wall 225 and a fourth side wall 227 opposite to each other. The first side wall 221 and the second side wall 223 are connected between the third side wall 225 and the fourth side wall 227. The first side wall 221, the second side wall 223, the third side wall 225, the fourth side wall 227, and the top wall 210 cooperatively define the receiving space 201. The first attracting member 320 is disposed at the first side wall 221, and the second attracting member 420 is disposed at the second side wall 223.

As illustrated in FIG. 9, when the storage box 10 is in the closed state, the second attracting member 420 is located below the hinge member 500. As illustrated in FIG. 7, when the storage box 10 is in the open state, the second attracting member 420 is located at a side of the hinge member 500. When the storage box 10 is in the closed state, the first side wall 221 engages with the first side wall 121, the second side wall 223 engages with the second side wall 123, the third side wall 225 engages with the third side wall 125, and the fourth side wall 227 engages with the fourth side wall 127. In the embodiment in which the rotation shaft is disposed within the rotation hole to provide a rotatable connection, the rotation shaft is provided at one of the first side wall 221 and the first side wall 121, and the rotation hole is provided in the other of the first side wall 221 and the first side wall 121.

When the storage box 10 is in the closed state, an outer surface of the first side wall 221 is flush with an outer surface of the first side wall 121, an outer surface of the second side wall 223 is flush with an outer surface of the second side wall 123, an outer surface of the third side wall 225 is flush with an outer surface of the third side wall 125, and an outer surface of the fourth side wall 227 is flush with an outer surface of the fourth side wall 127. In this way, the appearance of the storage box 10 can be improved. Furthermore, when the storage box 10 is in the open state, an angle between the first side wall 221 and the first side wall 121 is a right angle or an obtuse angle. When the storage box 10 is in the open state, the angle between the first side wall 221 and the first side wall 121 is a right angle or an obtuse angle. In the embodiment, when the storage box 10 is in the open state, the angle between the first side wall 221 and the first side wall 121 is about 90 degrees, such that a portion of the body 100 blocked by the cover 200 in a vertical direction is relatively less, or the second side wall 223 will not block the body 100 in the vertical direction, which avoids the cover 200 from interfering with the operations of storing or taking out the TWS earphones.

The technical features of the embodiments described above can be arbitrarily combined. In order to simplify the description, all possible combinations of the technical features in the above embodiments have not been described. However, as long as there is no contradiction in the combination of these technical features, the combination of these technical features should be considered to be within the scope described in present disclosure.

The present disclosures describe certain embodiments in more specific and detailed manner, but should not be read to limit the scope of the present disclosure. It should be noted that modifications and improvements can be made by those skilled in the art within the spirit and principle of the above embodiments, and those modifications and improvement should be included within the scope of protection of the present disclosure. Therefore, the scope of the present disclosure shall be subject to the appended claims.

What is claimed is:

1. A storage box, comprising:
a body provided with a receiving space;
a cover rotatably attached to the body, wherein the cover is configured to rotate relative to the body to drive the storage box between an open state and a closed state, the cover covering the receiving space when the storage box is in the closed state, and the receiving space being exposed when the storage box is in the open state; and
a first magnetic unit comprising a first magnetic member and a first attracting member, wherein the first magnetic member is attached to the body, and the first attracting member is attached to the cover;
wherein opening the storage box from the closed state causes the first attracting member to move closer to the first magnetic member such that magnetic force between the first magnetic member and the first attracting member drives the cover to rotate away from the closed state and into the open state;
wherein the storage box further comprises a second magnetic unit, wherein the second magnetic unit comprises a second magnetic member and a second attracting member, wherein the second magnetic member is attached to the body, and the second attracting member is attached to the cover;
wherein closing the storage box from the open state causes the second attracting member to move closer to the second magnetic member such that the magnetic force between the second magnetic member and the second attracting member drives the cover to rotate to away from the open state and into the closed state;
wherein the body comprises a bottom wall, a circumferential member extending from an edge of the bottom wall, and a supporting member connected to an end of the circumferential member away from the bottom wall;
wherein the bottom wall, the circumferential member, and the supporting member cooperatively define the receiving space;
wherein the first magnetic member and the second magnetic member are attached to the supporting member; when the storage box is in the closed state, a distance between the first magnetic member and an outer surface of the bottom wall is greater than a distance between the first attracting member and the outer surface of the bottom wall; and
wherein when opening the storage box, the first attracting member is moved in a direction away from the bottom wall and closer to the first magnetic member.

2. The storage box of claim 1, wherein when opening the storage box, the cover or the first attracting member abuts against the supporting member to limit a range of rotation of the cover relative to the body.

3. The storage box of claim 1, wherein the first magnetic member and the second magnetic member are disposed in the supporting member.

4. The storage box of claim 1, wherein the circumferential member comprises a first side wall and a second side wall opposite to the first side wall, and a third side wall and a fourth side wall opposite to the third side wall;
wherein the third side wall and the fourth side wall are connected between the first side wall and the second side wall;
wherein the first side wall, the second side wall, the third side wall, and the fourth side wall are sequentially and circumferentially connected between the bottom wall and the supporting member;
wherein the first magnetic member and the second magnetic member are disposed in the supporting member and spaced apart from each other; and
wherein the first magnetic member is closer to the first side wall than the second magnetic member, the first magnetic member is disposed away from the first side wall, and a space is defined between the first magnetic member and the first side wall to allow the first attracting member to move therein.

5. The storage box of claim 4, wherein the cover is provided with a receiving space, and the receiving space of the cover communicates with the receiving space of the body when the storage box is in the closed state.

6. The storage box of claim 5, wherein the cover comprises a top wall and a circumferential member circumferentially extending from an edge of the top wall to cooperatively define the receiving space of the cover, and the first attracting member and the second attracting member are attached to the circumferential member of the cover.

7. The storage box of claim 6, wherein the circumferential member of the cover comprises a first side wall and a second side wall opposite to each other;
wherein the first attracting member is attached to first side wall of the cover, and the second attracting member is attached to the second side wall of the cover; and
wherein when the storage box is in the closed state, the first side wall of the cover engages with the first side wall of the body, and the second side wall of the cover engages with the second side wall of the body.

8. The storage box of claim 7, wherein when the storage box is in the closed state, an outer surface of the first side wall of the cover is flush with an outer surface of the first side wall of the body, and an outer surface of the second side wall of the cover is flush with an outer surface of the second side wall of the body.

9. The storage box of claim 7, wherein when the storage box is in the open state, an angle between the first side wall of the cover and the first side wall of the body is a right angle or an obtuse angle.

10. The storage box of claim 7, wherein one of the first side wall of the cover and the first side wall of the body is provided with a rotation shaft, and another of the first side wall of the cover and the first side wall of the body is provided with a rotation hole, the rotation shaft engages in the rotation hole so as to rotatably connect the cover and the body.

11. The storage box of claim 1, wherein one of the first magnetic member and the first attracting member is a magnet, and another of the first magnetic member and the first attracting member is a magnet or a magnetizable metal member; one of the second magnetic member and the second attracting member is a magnet, and the other of the second magnetic member and the second attracting member is a magnet or a magnetizable metal member.

12. The storage box of claim 11, wherein the first magnetic member and the first attracting member both are bar-shaped;
wherein when the storage box in the closed state, a line of magnetic force of the first magnetic member in a length direction of the first magnetic member is perpendicular to a line of magnetic force of the first attracting member in a length direction of the first attracting member; and
wherein when the storage box is in the open state, the line of magnetic force of the first magnetic member in the length direction of the first magnetic member is parallel to the line of magnetic force of the first attracting member in the length direction of the first attracting member.

13. The storage box of claim 11, wherein the first magnetic member and the first attracting member are both bar-shaped;
wherein when the storage box in the closed state, a line extending through the N pole and the S pole of the first magnetic member is perpendicular to a line extending through the N pole and the S pole of the first attracting member; and
wherein when the storage box is in the open state, the line extending through the N pole and the S pole of the first magnetic member is parallel to the line extending through the N pole and the S pole of the first attracting member.

14. The storage box of claim 1, wherein the storage box comprises a battery, the storage box is configured to store a headphone, and the battery is capable of charging the headphone stored in the storage box.

15. The storage box of claim 1, wherein the first magnetic member and the first attracting member are both bar-shaped, and the first magnetic member and the first attracting member are misaligned with each other in a length direction of the first magnetic member and a length direction of the first attracting member when the storage box is in the closed state.

16. A storage box, comprising:
a body defining a receiving space;
a cover rotatably attached to the body and configured to rotatably drive the storage box to switch between an open state and a closed state; and
a magnetic unit comprising a first magnetic member and a first attracting member, the first magnetic member attached to the body, and the first attracting member attached to the cover,
wherein rotating the cover from the closed state toward the open state causes the first attracting member to move closer to the first magnetic member;
wherein after rotating the cover to a certain position with respect to the body, magnetic force between the first magnetic member and the first attracting member drives the cover to rotate to and remain the open state;
wherein the first magnetic member and the first attracting member are both bar-shaped;
wherein when the storage box in the closed state, a length direction of the first magnetic member is perpendicular to a length direction of the first attracting member; and
wherein when the storage box is in the open state, the length direction of the first magnetic member is parallel to the length direction of the first attracting member.

17. An electronic device, comprising:
a body defining a receiving space;
a cover movably attached to the body and operable between a closed position where the cover covers the receiving space and an open position where the receiving space is exposed;
earphones configured to be detachably stored in the receiving space;
a battery configured to charge the earphones;
a first magnetic unit comprising a first magnetic member and a first attracting member respectively attached to the body and the cover;
a second magnetic unit comprising a second magnetic member and a second attracting member respectively attached to the body and the cover;
wherein rotating the cover from the closed position toward the open position causes the first attracting member to move closer to the first magnetic member till the cover is secured to the body in the open position, and rotating the cover from the open position to the closed position causes the second attracting member to move closer to the second magnetic member to enable the cover to rotate to away from the open position and into the closed position;
wherein the body comprises a bottom wall, a circumferential member extending from an edge of the bottom wall, and a supporting member connected to an end of the circumferential member away from the bottom wall;
wherein the bottom wall, the circumferential member, and the supporting member cooperatively define the receiving space;
wherein the first magnetic member and the second magnetic member are attached to the supporting member; when the cover is in the closed position, a distance between the first magnetic member and an outer surface of the bottom wall is greater than a distance between the first attracting member and the outer surface of the bottom wall; and
wherein when opening the cover, the first attracting member is moved in a direction away from the bottom wall and closer to the first magnetic member.

* * * * *